United States Patent
Schwertberger et al.

(10) Patent No.: US 9,452,706 B2
(45) Date of Patent: Sep. 27, 2016

(54) MANEUVERING AID, METHOD, AND HEADLIGHT DEVICE FOR A UTILITY VEHICLE

(75) Inventors: Walter Schwertberger, Althegnenberg (DE); Markus Brummer, Schweitenkirchen (DE); Daniel Heyes, München (DE); Christoph Resch, München (DE)

(73) Assignee: MAN Truck & Bus AG, Munich (DE)

( * ) Notice: Subject to any disclaimer, the term of this patent is extended or adjusted under 35 U.S.C. 154(b) by 1071 days.

(21) Appl. No.: 13/227,899

(22) Filed: Sep. 8, 2011

(65) Prior Publication Data
US 2012/0056540 A1    Mar. 8, 2012

(30) Foreign Application Priority Data

Sep. 8, 2010 (DE) .......... 10 2010 044 658

(51) Int. Cl.
*B60Q 1/12* (2006.01)
*B60Q 1/24* (2006.01)
*B60Q 1/22* (2006.01)

(52) U.S. Cl.
CPC .. *B60Q 1/24* (2013.01); *B60Q 1/22* (2013.01)

(58) Field of Classification Search
CPC ............ B60Q 1/22; B60Q 1/24; B60Q 1/00; B60Q 1/0011; B60Q 1/0017; B60Q 1/02
USPC .......................... 315/79, 77, 80, 84; 362/459
See application file for complete search history.

(56) References Cited

U.S. PATENT DOCUMENTS

| | | | |
|---|---|---|---|
| 6,343,869 B1* | 2/2002 | Kobayashi | 362/37 |
| 6,396,395 B1* | 5/2002 | Zielinski et al. | 340/425.5 |
| 6,422,728 B1* | 7/2002 | Riggin | 362/540 |
| 6,580,362 B1* | 6/2003 | Zimmerman et al. | 340/425.5 |
| 6,717,376 B2* | 4/2004 | Lys et al. | 315/292 |
| 6,728,393 B2* | 4/2004 | Stam et al. | 382/104 |
| 7,155,329 B2* | 12/2006 | Mepham | B60R 16/0232 303/121 |
| 7,276,854 B1* | 10/2007 | Deutsch et al. | 315/77 |
| 7,397,349 B2* | 7/2008 | Lahr et al. | 340/433 |
| 7,525,254 B2* | 4/2009 | Lys et al. | 315/77 |
| 2008/0180967 A1* | 7/2008 | Totani et al. | 362/518 |
| 2009/0273941 A1* | 11/2009 | Englander et al. | 362/464 |
| 2010/0066514 A1* | 3/2010 | Sekol | 340/431 |
| 2012/0032593 A1* | 2/2012 | Hsieh | 315/79 |

FOREIGN PATENT DOCUMENTS

| | | |
|---|---|---|
| DE | 41 19 436 A1 | 2/1993 |
| DE | 10 2004 060 026 A1 | 6/2006 |
| DE | 102 48 650 B4 | 8/2006 |

* cited by examiner

*Primary Examiner* — Jimmy Vu
(74) *Attorney, Agent, or Firm* — Laurence A. Greenberg; Werner H. Stemer; Ralph E. Locher

(57) ABSTRACT

A maneuvering aid for a vehicle has a lighting device configured to at least partially illuminate at least an underlying surface under the vehicle and/or a vehicle bodywork. A control device configured to control the lighting device in order to activate and/or deactivate same. The control device is configured to control the lighting device at least as a function of a vehicle speed and/or of a vehicle acceleration and/or of a distance of the vehicle from a roadway boundary or an obstacle in the roadway. A corresponding method, a corresponding vehicle, and a headlight assembly are described as well.

18 Claims, 1 Drawing Sheet

MANEUVERING AID, METHOD, AND HEADLIGHT DEVICE FOR A UTILITY VEHICLE

CROSS-REFERENCE TO RELATED APPLICATION

This application claims the priority, under 35 U.S.C. §119, of German patent application DE 10 2010 044 658.0, filed Sep. 8, 2010; the prior application is herewith incorporated by reference in its entirety.

BACKGROUND OF THE INVENTION

Field of the Invention

The invention relates to a maneuvering aid for a vehicle, in particular for a utility vehicle, comprising lighting device which is configured to at least partially illuminate at least an underlying surface underneath the vehicle and/or a vehicle bodywork, and comprising a control device which is configured to control the lighting device in order to activate and/or deactivate same.

Furthermore, the invention relates to a method for carrying out maneuvering assistance for a vehicle, in particular for a utility vehicle, in which a lighting device that is configured to illuminate at least an underlying surface under the vehicle and/or a vehicle bodywork is controlled in order to activate and/or deactivate the same.

Furthermore, the invention relates to a vehicle, in particular a utility vehicle, comprising such a maneuvering aid.

In addition, the invention relates to a headlight device for a vehicle having lighting means which are configured to at least partially illuminate the surroundings of a vehicle and an underlying surface under the vehicle and/or a vehicle bodywork.

A maneuvering aid of the generic type which forms part of the prior art and a corresponding method of the generic type are known, for example, from commonly assigned German patent DE 41 19 436 C2. The maneuvering aid described therein is provided in particular for utility vehicles, preferably for trucks. The truck which is equipped with this maneuvering aid has, for the purpose of assisting a maneuvering operation, not only exterior rear view mirrors but also what is referred to as a driving off mirror on the front seat passenger side of said truck. This driving off mirror permits a driver of the truck to be able to look into a prescribed minimum field of vision which is bounded by the driving off mirror and which comprises at least partially the underlying surface under the vehicle, in particular a roadway, as well as the truck or the truck bodywork. Furthermore, the maneuvering aid according to DE 41 19 436 C2 comprises additional lighting device, which are provided alongside the vehicle standard lighting system, are assigned to the driving off mirror for illuminating or lighting the minimum field of vision and are embodied in this case as additional headlights. These additional headlights are provided alongside the abovementioned vehicle standard lighting system, which comprises, in particular, main beam headlights and/or dipped headlights. The additional headlights are configured to illuminate the underlying surface under the vehicle or the roadway in order to sufficiently light the predefined minimum field of vision bounded by the driving off mirror. The activation of these additional headlights for lighting the minimum field of vision can be coupled, for example, to the activation of the main beam headlight or the dipped headlight. Likewise it is possible to provide that the additional headlights can also be activated separately and independently by the driver activating them via a correspondingly provided switch.

Although the maneuvering aid which is known from DE 41 19 436 C2 thus permits the safety for the driver to be increased by permitting the driver of the utility vehicle to look into the minimum field of vision better even when traveling under unfavorable light conditions and weather conditions, the activation and deactivation of the additional headlights depend exclusively on the driver's subjective estimation. In at least some, and possibly also critical, driving situations it should at least not be left exclusively to the driver to decide about the necessity of activating and deactivating the additional headlight.

Furthermore, German laid-open, non-prosecuted patent application DE 10 2004 060 026 A1 discloses a lighting device for a vehicle which forms part of the prior art. In this case, in addition to the conventional reversing lamps or the conventional reversing lighting system, which is switched on when the reversing gearspeed is engaged, a further or additional reversing light is provided. The activation or deactivation of this additional reversing light is also coupled to the engagement of the reversing gearspeed of the vehicle. In particular, this additional reversing light is activated when the reversing gearspeed of the vehicle is engaged. This reversing light is preferably embodied as a spotlight and is arranged and oriented in such a way that it selectively lights a space located laterally behind the vehicle. As a result, it is possible for the driver to perceive roadway markings and curbstone edgings and other obstacles even when the ambient lighting is poor. Furthermore, the activation and deactivation of this additional reversing light can also be dependent on a predetermined steering wheel lock or steering wheel lock angle of the vehicle.

In addition, German patent DE 102 48 650 B4 discloses a maneuvering aid for a vehicle in which lighting device for illuminating at least one underlying surface under the vehicle are provided, which lighting device can be activated when a reversing gearspeed of the vehicle is engaged, the doors of the vehicle are unlocked or as a function of the interior lighting of the vehicle. The lighting device of this maneuvering aid which forms part of the prior art can be provided in particular in lighting devices, such as for example a headlight, rear light etc., which are provided in any case on or in the vehicle, or can use the light source thereof.

SUMMARY OF THE INVENTION

It is accordingly an object of the invention to provide a maneuvering aid for a utility vehicle which overcomes the above-mentioned disadvantages of the heretofore-known devices and methods of this general type and which provides for an improved such maneuvering aid as well as methods for carrying out maneuvering assistance for vehicles, in such a way that the safety during maneuvering operations is increased by improved activation and deactivation of the maneuvering aid.

With the foregoing and other objects in view there is provided, in accordance with the invention, a maneuvering aid for a vehicle, in particular for a heavy-duty utility vehicle. The maneuvering aid comprises:

a lighting device configured to at least partially illuminate one or both of an underlying surface underneath the vehicle and a vehicle bodywork; and a control device connected to and controlling said lighting device between activation and deactivation, said control device being configured to control said lighting device in dependence on at least one parameter selected from the group consisting of a vehicle speed, a vehicle acceleration, a distance of the vehicle from a roadway boundary, and an obstacle in the roadway.

In other words, the maneuvering aid according to the invention is based on the generic prior art by virtue of the fact that the control device is configured to control the lighting device at least as a function of a vehicle speed and/or of a vehicle acceleration and/or of a distance of the vehicle from a roadway boundary or an obstacle in the roadway. The maneuvering aid according to the invention accordingly comprises a lighting device, or lighting means, embodied as a maneuvering aid lighting system and whose activation and deactivation does not depend directly on activation by the driver or the subjective estimation of the driving situation by the driver. Instead, the maneuvering aid lighting system is activated automatically at least in some cases in which a maneuvering operation is assumed, in order to light a corresponding minimum field of vision or field of lighting. The maneuvering aid according to the invention performs the activation and deactivation at least partially as a function of ambient conditions of the vehicle and of the driving behavior of the vehicle. In particular, the vehicle speed is therefore taken into account during the activation or deactivation of the lighting device. For example, it is possible to infer that a maneuvering operation of the vehicle is occurring if the vehicle has a relatively low vehicle speed over a certain time period. In this case, the control device actuates the lighting device in order to activate same. On the other hand, in another case in which the vehicle has, for example, a relatively high vehicle speed over a certain time period, the control device concludes that a normal journey by the vehicle is taking place and deactivates the lighting device or maintains the deactivated state of the lighting device. However, it is also conceivable for the lighting device not to be activated by the control device particularly when there is a very low vehicle speed; for example if the vehicle is in a persistent stationary state, for example owing to a red phase of a traffic light, the control device does not conclude that a maneuvering operation of the vehicle is taking place, and said control device therefore prevents activation of the lighting device.

Accordingly, the above statements relating to the vehicle speed being taken into account also apply to the vehicle acceleration being taken into account. When the vehicle acceleration is extremely low, the control device preferably concludes that a maneuvering operation of the vehicle is occurring; in particular when the direction of the acceleration changes relatively frequently over a specific time period, for example due to a change in the direction or reversal in the direction.

In this context, it is particularly preferred to take into account both the vehicle speed and the vehicle acceleration, as a result of which more reliable conclusions can be drawn about maneuvering operation of the vehicle. In order to detect the vehicle speed and the vehicle acceleration, it is possible, for example, to use sensors which are known to a person skilled in the art and which are either installed additionally on the vehicle or else are already present in the vehicle in any case. For example, a speed sensor—which is well known to those of skill in the art—can be used to detect the vehicle speed, and an acceleration sensor which is well known as well can be used to detect the vehicle acceleration.

Furthermore, according to the invention distances of the vehicle from one or more roadway markings or one or more obstacles in the roadway are also taken into account in the assessment as to whether the lighting device are to be activated or deactivated. In addition to taking into account the distance of the vehicle from a roadway marking or an obstacle in the roadway, the vehicle speed and preferably also the vehicle acceleration are preferably also additionally included in the assessment as to whether the lighting device is to be activated. For example, given a sufficiently low vehicle speed and preferably corresponding vehicle acceleration and a relatively short distance of the vehicle from a roadway marking or an obstacle in the roadway, the control device can conclude that a maneuvering operation of the vehicle is occurring. Roadway boundaries can be, in particular, roadway markings such as, for example, road markings or ground markings which take the form of colored markings on the surface of traffic areas of the road traffic. In addition, roadway boundaries can, however, also be roadway directing devices, in particular reflector posts or guide posts, which constitute traffic installations that serve to better delineate, and form the profile of, the roadway. Furthermore, roadway boundaries can be formed, in particular, by crash barriers or safety barriers. Roadway obstacles can, on the other hand, be any obstacles, for example parked vehicles, road signs, traffic light installations, fire hydrants, etc. The distance from the roadway boundaries or the obstacles in the roadway is preferably determined by distance sensors, for example radar sensors or the like, which are known to a person skilled in the art, with a photosensor being preferably also used to identify the corresponding roadway markings or obstacles in the roadway when required and to differentiate them from other detected objects which are not of more interest; it is conceivable, for example, for photosensors to detect roadway markings and for distance sensors to determine the corresponding distance when roadway markings are present; it is possible, for example, to provide that a distance from the vehicle bodywork to a corresponding roadway marking, lying in a parallel plane to the underlying surface under the vehicle, is determined on the basis of the distance sensor. In addition it is conceivable that the photosensor is, inter alia, also used to determine the light conditions in the surroundings of the vehicle. On this basis, the control device can draw conclusions about whether or not it is necessary to activate the lighting device.

The maneuvering aid according to the invention can advantageously be developed in such a way that the control device is configured to control the lighting device additionally at least as a function of engagement of a reverse gear of the vehicle and/or a switching on of a vehicle lowbeam (i.e., dipped headlight) and/or of a steering wheel angle. Of course, it may be appropriate, in at least some cases also to additionally apply the activation and deactivation conditions known from the prior art in the maneuvering aid according to the invention in order to permit the lighting device of the maneuvering aid according to the invention to be activated and deactivated as a function of both vehicle-state-specific parameters and at least partially of vehicle-surroundings-specific parameters. This can lead in certain cases to synergy and/or particularly advantageous and reliable automatic activation of the lighting device of the maneuvering aid; the activation of the lighting device of the maneuvering aid is, for example, not absolutely necessary and desired at every relatively large steering wheel lock angle but a maneuvering operation of the vehicle can be inferred on the basis of the abovementioned activation and deactivation conditions according to the invention, such as a low vehicle speed with a large steering wheel lock angle. The same applies accordingly also to the engagement of a reverse gearspeed and to the switching on of a vehicle dipped headlight.

Furthermore, the maneuvering aid according to the invention can be implemented in such a way that the control device is configured to control the lighting device in order to activate same when the vehicle speed drops below a predetermined vehicle speed and/or the vehicle acceleration drops below a predetermined vehicle acceleration. In particular, in this case it is advantageous to activate the lighting device of the maneuvering aid when the vehicle speed drops below, for example, a relatively low speed, in particular walking pace, since in this case a maneuvering operation of the vehicle takes place with increased probability. For example, the lighting device of the maneuvering aid are activated at a speed of the vehicle below 3.6 km/h (e.g., 2.2 mph). In addition to taking into account the vehicle speed, the vehicle acceleration is preferably also used. For example, it is possible to assume with increased probability that the vehicle at low vehicle speeds and low vehicle accelerations is carrying out a maneuvering operation. Furthermore, in this context it is also conceivable that the above-mentioned activation conditions have to be present for a predetermined time period before the lighting device are activated by the control device. For example, in this case it is possible to provide that, at a vehicle speed of virtually 0 km/h, which is, furthermore, present for a time period of a plurality of seconds, it is assumed that a maneuvering operation of the vehicle is not being performed but rather it is possibly concluded that the vehicle is in a stationary state, for example owing to a red phase of a traffic light.

Furthermore, the maneuvering aid according to the invention can be implemented in such a way that the control device is configured to control the lighting device in order to deactivate same when the vehicle speed exceeds a predetermined vehicle speed and/or the vehicle acceleration exceeds a predetermined vehicle acceleration. In contrast to the case described above, when a certain vehicle speed is exceeded, for example when the walking pace is exceeded, the lighting device of the maneuvering aid according to the invention are deactivated, since the control device can then assume that no maneuvering operation is being performed by the vehicle. In such a case, it is particularly advantageous to include the vehicle acceleration in the assessment regarding the deactivation of the lighting device since, even in the case of relatively high vehicle accelerations over a predetermined time period it is possible to assume that a maneuvering operation is not being performed by the vehicle but rather that the vehicle is being accelerated to the normal, prescribed vehicle speed.

Furthermore, the maneuvering aid according to the invention can be implemented in such a way that the control device is configured to control the lighting device in order to activate same when the distance of the vehicle from the roadway boundary or the obstacle in the roadway drops below a predetermined distance. In this case it is particularly advantageous to activate the lighting device of the maneuvering aid according to the invention when the vehicle is very close to a roadway boundary, such as a roadway marking, a reflector post or a crash barrier, that is to say the distance from the roadway boundary decreases and drops below a predetermined distance. This distance may be, for example, 30 cm (e.g., <1 ft) between the vehicle bodywork and the roadway marking. In addition to taking into account the above-mentioned distance, the vehicle speed is preferably also considered. This is because it may frequently be the case that although the vehicle is located close to roadway boundaries such as roadway markings, reflector posts or crash barriers and at the same time drops below the predetermined distance, no maneuvering operation is actually being performed. In this case, it is particularly preferred to continue to check whether the vehicle speed exceeds a predetermined vehicle speed. On this basis it is then possible to assess whether the vehicle is traveling at full speed ahead or a maneuvering operation is being performed in which the predetermined distance is also undershot. It is likewise conceivable for lighting by the lighting device to be implemented only at the locations at which the predetermined distance is undershot; for example, the lighting device can comprise a plurality of headlights, in which case only the headlight at which undershooting of the distance is detected the above-mentioned is activated.

In addition, the maneuvering aid according to the invention can also be embodied in such a way that the control device is configured to control the lighting means in order to deactivate same when the distance of the vehicle from the roadway boundary or the obstacle in the roadway exceeds a predetermined distance. In contrast to the case described above, the lighting device is deactivated when the predetermined distance between the vehicle and the roadway markings is exceeded. However, in this case the vehicle speed is also preferably additionally taken into account so that despite any large distance of the vehicle from roadway boundaries or obstacles in the roadway, activation can be performed, for example when the vehicle speed is relatively low and when further activation conditions are met.

Furthermore, the maneuvering aid according to the invention can also be developed in such a way that the lighting device is embodied by a maneuvering aid lighting system which is configured to be controlled by the control device, separately from a vehicle standard lighting system. In this case, the vehicle standard lighting system can comprise all the lighting device which are customarily provided in the vehicle, in particular the utility vehicle such as a truck. The abovementioned vehicle standard lighting system preferably comprises a full beam headlight for lighting the roadway, a dipped headlight or lowbeam headlight for lighting the roadway to a certain degree and at the same time to avoid dazzling, for example, the oncoming traffic and other road users, a parking light or side light which usually illuminates together with the lowbeam headlight or hi-beam headlight so that even if, for example, a lowbeam headlight fails at least the contours of the vehicle in question can be seen by the oncoming traffic, a parking light for a parked state of the vehicle, a travel direction indicator or flashing indicator light, a fog light, a turning indicator light, a wide beam light, which optionally constitutes an additional full beam headlight, daytime running lights, tail lights, which are usually activated together with the dipped headlight, brake lights, reflectors, number plate lighting, rear fog lights, reversing lamps, which are, in particular, white in color but which emit light only when the reverse gearspeed is engaged, etc. The lighting device of the maneuvering aid according to the invention are particularly preferably embodied as separate or additional headlights, i.e. in addition to the abovementioned vehicle standard lighting system; the maneuvering aid lighting system of the maneuvering aid according to the invention can likewise be embodied so as to correspond to the maneuvering aid headlights which are described in the abovementioned German patent DE 41 19 436 C2, the content of which is incorporated herein by reference in its entirety. Alternatively, the maneuvering lighting can also be arranged in already present lighting means of the vehicle standard lighting system, such as have been described above. For example, the lighting device of the maneuvering aid can be lighting device of the vehicle standard lighting system which therefore carry out a plurality of functions, i.e. in addition to the customary function they also carry out the maneuvering aid lighting function. It is likewise, however, also conceivable that the lighting device are additionally or separately integrated into a headlight which forms part of the vehicle standard lighting system.

The method of the generic type is based on the prior art of the generic type by virtue of the fact that the lighting device is controlled at least as a function of a vehicle speed and/or a vehicle acceleration and/or a distance of the vehicle from a roadway boundary or an obstacle in the roadway. As a result, the properties and advantages mentioned in conjunction with the maneuvering aid according to the invention come about in the same way or a similar way, for which reason, in order to avoid repetitions, reference is made to the corresponding statements relating to the maneuvering aid according to the invention.

The same applies accordingly also to the following preferred embodiments of the method according to the invention, wherein, in order to avoid repetitions, reference is also made in this regard to the corresponding statements relating to the maneuvering aid according to the invention.

The method according to the invention can be advantageously embodied in such a way that the lighting device is additionally controlled at least as a function of engagement of a reverse gearspeed of the vehicle and/or a switching on of a vehicle lowbeam headlight and/or of a steering wheel turn angle.

The method according to the invention can also be advantageously configured in such a way that the lighting device is controlled so as to be activated when the vehicle speed drops below a predetermined vehicle speed and/or the vehicle acceleration drops below a predetermined vehicle acceleration.

In addition, the method according to the invention can be implemented in such a way that the lighting device is controlled so as to be deactivated when the vehicle speed exceeds a predetermined vehicle speed and/or the vehicle acceleration exceeds a predetermined vehicle acceleration.

Furthermore, the method according to the invention can be implemented in such a way that the lighting device is controlled so as to be activated when the distance of the vehicle from the roadway marking or the obstacle in the roadway drops below a predetermined distance.

Furthermore, the method according to the invention can be embodied in such a way that the lighting device is controlled so as to be deactivated when the distance of the vehicle from the roadway marking or the obstacle in the roadway exceeds a predetermined distance.

In addition, the method according to the invention can be developed in such a way that the lighting device which is embodied by a maneuvering aid lighting system are controlled separately from a vehicle standard lighting system.

The vehicle according to the invention comprises the maneuvering aid according to the invention which is explained above and which is preferably suitable for carrying out the method according to the invention.

The headlight device according to the invention is based on the generic prior art by virtue of the fact that the lighting device for lighting the surroundings of the vehicle (i.e., first lighting means) and the lighting device for lighting the underlying surface under the vehicle and/or the vehicle bodywork (i.e., second lighting means) are separated by a dividing wall in order to illuminate at least partially different areas. In the alternative, or in addition, the first and second lighting means are embodied as direction-dependent lighting device for respective direction-dependent illumination of at least partially different areas.

The headlight device according to the invention can be advantageously developed in such a way that the lighting device are embodied by one or more elements from the group comprising an incandescent lamp, gas discharge lamp, arc lamp and light emitting diode.

Furthermore, the headlight device according to the invention can be implemented in such a way that the lighting device are constructed with the same design or with mutually different designs.

Other features which are considered as characteristic for the invention are set forth in the appended claims.

Although the invention is illustrated and described herein as embodied in a maneuvering aid for a utility vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
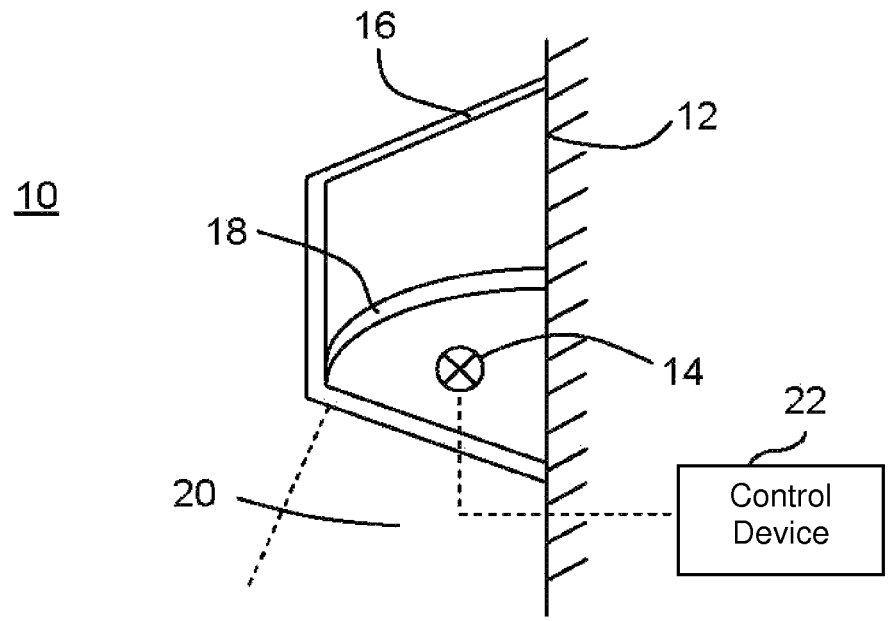
FIG. 1 illustrates a first exemplary embodiment of a maneuvering aid according to the invention which is suitable for carrying out the method according to the invention.

Referring now to the figures of the drawing in detail and first, particularly, to FIG. 1 thereof, there is shown a maneuvering aid 10 according to the invention according to a first exemplary embodiment of the invention. The novel maneuvering aid 10 is provided in this case for a utility vehicle, in particular for a truck or heavy truck. As is apparent from FIG. 1, the maneuvering aid according to the invention comprises lighting device which, in this exemplary embodiment are embodied in the form of a headlight which, in the activated state, lights a region or a lighting field 20 which is to be lit and which comprises at least partially an underlying surface underneath the vehicle and at least partially a utility vehicle section or a utility vehicle bodywork section 12. The utility vehicle section can be embodied here, for example by a trailer, a semitrailer, a traction engine, a truck tractor etc. In particular, the headlight in this exemplary embodiment is embodied by a maneuvering aid lighting system which is provided alongside or in addition to a vehicle standard lighting system which is usually provided on the vehicle. The lighting device which is embodied as headlight(s) comprise a lamp covering glass or a headlight glass 16 which in this exemplary embodiment is arranged and attached on the utility vehicle section 12. Furthermore, lighting device 14 are arranged in the headlight glass 16, which lighting device 14 can be embodied as one or more incandescent lamps, gas discharge lamps, arc lamps, luminescent diodes or light emitting diodes (LEDs) etc., which are known to a person skilled in the art. Furthermore, a dividing wall 18 is arranged in the headlight glass 16 in such a way that two spaces are formed in the headlight, specifically an upper and a lower space as shown in FIG. 1, wherein the lighting device 14 are located in the lower space. In contrast, no lighting device are provided in the upper space. However, the dividing wall 18 in this exemplary embodiment is at least partially translucent or embodied as a light filter, with the result that the headlight can be used or adapted to light a further lighting field. In order to control the lighting device in order to activate it in order to light the lighting field 20 and to deactivate it in order to bring about a switched-off state, the maneuvering aid 10 according to the invention also has a control device or a controller 22 which is known to a person skilled in the art, is coupled to the lighting device 14 in a way known to a person skilled in the art, for example by means of electrical lines, in order to activate and/or deactivate said lighting device 14, and can switch the lighting device on and off. The control device 22 can be provided additionally or separately for the maneuvering aid 10 or else can be part of a control system which is located in the utility vehicle in any case.

During operation, the maneuvering aid 10 according to the invention carries out the method according to the invention for carrying out the maneuvering assistance of the utility vehicle, which occurs as follows.

The control device 22 controls the lighting device or the maneuvering aid lighting system which is embodied as headlight(s) as a function, inter alia, of a vehicle speed and/or a vehicle acceleration and/or a distance of the vehicle from a roadway marking and/or an obstacle in the roadway. For this purpose, the control device 22 continuously monitors, by a means of speed sensors, acceleration sensors and distance and photosensors (not illustrated) which are known to a person skilled in the art, the current or instantaneous vehicle speed, the current vehicle acceleration and the current distance of the vehicle or of the vehicle bodywork from roadway boundaries and roadway obstacles. Roadway boundaries are, for example, roadway markings, reflector posts, crash barriers, curbstones, etc., and obstacles in the roadway are, for example, parked vehicles and further possible obstacles on the roadway or near to the roadway such as stop light systems, road signs, hydrants etc.

The control device 22 activates the maneuvering lighting system in this exemplary embodiment at least when the instantaneously sensed vehicle speed drops below a predetermined vehicle speed, for example walking pace. In addition, the control device 22 takes into account the vehicle acceleration and also activates the maneuvering lighting system only when the vehicle acceleration drops below a predetermined vehicle acceleration.

Conversely, the control device 22 deactivates the maneuvering lighting system or keeps it deactivated when the vehicle speed exceeds the predetermined vehicle speed, for example the walking pace. In addition, the control device 22 takes into account the vehicle acceleration and deactivates the maneuvering lighting system or keeps it activated when the vehicle acceleration exceeds the predetermined vehicle acceleration even though the instantaneous vehicle speed drops below the predetermined vehicle speed.

The control device 22 preferably also takes into account a predetermined time period in which the vehicle speed and the vehicle acceleration must at least be present in order to activate the lighting device.

In addition, the control device 22 takes into account the distance of the vehicle from roadway boundaries and roadway obstacles and activates the maneuvering lighting system when the distance of the vehicle from the roadway boundary or the obstacle in the roadway drops below a predetermined distance. In particular, the control device 22 also takes into account the instantaneous vehicle speed here and assesses, on the basis of the instantaneous vehicle speed and the current distance, whether the maneuvering lighting system is to be activated; in particular, the maneuvering lighting system is activated when the vehicle speed drops below the predetermined vehicle speed and the instantaneous distance drops below the predetermined distance. In contrast, the maneuvering lighting system is not activated when the vehicle speed exceeds the predetermined vehicle speed even though the instantaneous distance drops below the predetermined distance.

Figure 2:
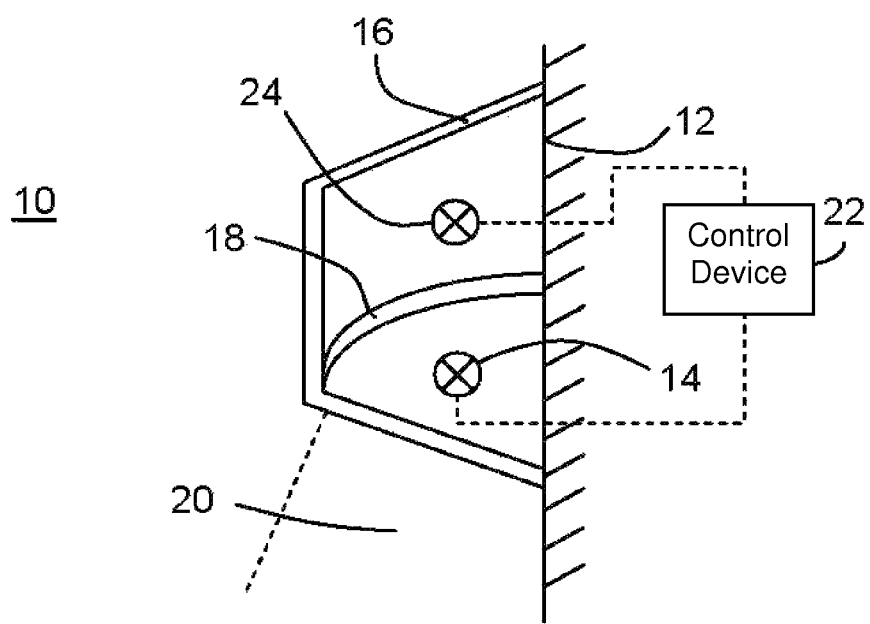
FIG. 2 illustrates a second exemplary embodiment of the maneuvering aid according to the invention which is suitable for carrying out the method according to the invention.

Referring now to FIG. 2, there is shown a maneuvering aid 10 according to the invention according to a second exemplary embodiment of the invention. The maneuvering aid 10 according to the invention according to the second exemplary embodiment differs from the maneuvering aid 10 according to the first exemplary embodiment only in that two separate lighting devices 24 and 14 are integrated into the upper and lower space of the headlight which light different areas. In this case, the dividing wall 18 is of opaque design so that both lighting device 14, 24 are assigned to their separate areas to be lit. Correspondingly, the controller 22 is coupled to both lighting devices 14, 24 in order to bring about their activation and deactivation, as explained in relation to the lighting device 14 of the first exemplary embodiment. For example, the lighting device 24 can be part of the vehicle standard lighting system and can light or illuminate the surroundings of the vehicle according to the regulations. In contrast, the lighting device 14 can be provided for lighting or illuminating the underlying surface under the vehicle and/or partially the vehicle bodywork according to the regulations, i.e. for lighting a different area from that lit by the lighting device 24.

For example, the lighting devices 14 and 24 in this exemplary embodiment can each be embodied as one or more incandescent lamps, gas discharge lamps, arc lamps, luminescent diodes or light emitting diodes (LEDs), or the like. Preferably, however, the lighting devices 14 and 24 are each embodied as one or more light emitting diodes (LEDs). Correspondingly, the lighting devices 24 which are embodied as one or more light emitting diodes can serve, for example, for lighting the surroundings of the vehicle. In contrast, the lighting devices 14 which are embodied as one or more light emitting diodes can serve, for example, for lighting at least the underlying surface underneath the vehicle and, preferably, also a part of the vehicle bodywork. In the case of lighting of the lateral surroundings of the vehicle with respect to the vehicle longitudinal axis of the vehicle, the lighting device 24 can be embodied, for example, as light emitting diodes which emit yellow light, while the lighting device 14 can be designed to light the underlying surface under the vehicle, for example as light emitting diodes which emit white light.

Furthermore, the lighting devices 14 and 24 can also be provided in different designs of illumination means. For example, the lighting device 24 is designed to light the surroundings of the vehicle by means of one or more conventional incandescent lamps etc., while the lighting device 14 is designed to light the underlying surface under the vehicle as one or more light emitting diodes (LEDs).

In one refinement of the second exemplary embodiment it is possible to provide that the nontranslucent dividing wall 18 in the lighting devices which are configured as headlight (s) is omitted and the lighting device 14 and 24 are embodied as direction-dependent lighting devices 14, 24. The directional dependence of the lighting device 24 is preferably selected such that the lighting device 24 only lights the surroundings of the vehicle, for example, only the front, rear and lateral surroundings of the vehicle. In contrast, the directional dependence of the lighting device 14 is then selected such that the lighting device 14 only lights the underlying surface under the vehicle at predetermined points and/or partially the vehicle bodywork, i.e. regions which are not lit by the lighting device 24 and which therefore differ partially or completely from the areas lit by the lighting device 24.

The features of the invention which are disclosed in the description above, in the drawings and in the claims can be essential to the implementation of the invention, either individually or in any desired combination.

The invention claimed is:

1. A maneuvering aid for a vehicle, comprising:
a lighting device configured to at least partially illuminate one or both of an underlying surface underneath the vehicle and a vehicle bodywork; and
a control device connected to and controlling said lighting device between activation and deactivation, said control device being configured to control said lighting device in dependence on at least one parameter selected from the group consisting of a vehicle speed, a vehicle acceleration, a distance of the vehicle from a roadway boundary, and an obstacle in the roadway, said control device being configured to activate said lighting device when the vehicle speed drops below a predetermined vehicle speed, the predetermined speed being a relatively low speed, in particular a walking pace;
said lighting device being a maneuvering aid lighting system controlled by said control device, separately from a vehicle standard lighting system.

2. The maneuvering aid according to claim 1, wherein said control device is configured to additionally control said lighting device in dependence on whether or not a reverse gear of the vehicle has been engaged, a low beam of the headlight has been turned on, and/or in dependence on a steering wheel turn angle.

3. The maneuvering aid according to claim 1, wherein said control device is configured to deactivate said lighting device when the vehicle speed exceeds a predetermined vehicle speed and/or the vehicle acceleration exceeds a predetermined vehicle acceleration.

4. The maneuvering aid according to claim 1, wherein said control device is configured to activate said lighting device when the distance of the vehicle from the roadway boundary or to the obstacle in the roadway drops below a predetermined distance.

5. The maneuvering aid according to claim 1, wherein said control device is configured to deactivate said lighting device when the distance of the vehicle from the roadway boundary or from the obstacle in the roadway exceeds a predetermined distance.

6. The maneuvering aid according to claim 1, configured for a heavy-duty utility vehicle.

7. A vehicle, comprising a maneuvering aid according to claim 1.

8. A method of providing maneuvering assistance in a vehicle, the method which comprises:
providing a lighting device configured to illuminate at least an underlying surface underneath the vehicle and/or a bodywork of the vehicle;
selectively activating and deactivating the lighting device in dependence on at least one parameter selected from the group consisting of a vehicle speed, a vehicle acceleration, a distance of the vehicle from a roadway boundary, and an obstacle in the roadway; and
deactivating the lighting device when the vehicle speed exceeds a predetermined vehicle speed, the predetermined speed being a relatively low speed, in particular a walking pace;
providing the lighting device as a maneuvering aid lighting system and controlling the lighting device separately from a vehicle standard lighting system.

9. The method according to claim 8, which comprises providing and controlling the lighting device in a heavy-duty utility vehicle.

10. The method according to claim 8, which comprises providing a maneuvering aid according to claim 1 and carrying out the method with the maneuvering aid.

11. The method according to claim 8, which comprises additionally controlling the lighting device in dependence on whether or not a reverse gear of the vehicle has been engaged, a low beam of the headlight has been turned on, and/or in dependence on a steering wheel turn angle.

12. The method according to claim 8, which comprises activating the lighting device when the vehicle speed drops below a predetermined vehicle speed and/or the vehicle acceleration drops below a predetermined vehicle acceleration.

13. The method according to claim 8, which comprises activating the lighting device when the distance of the vehicle from the roadway boundary or the obstacle in the roadway drops below a predetermined distance.

14. The method according to claim 8, which comprises deactivating the lighting device when the distance of the vehicle from the roadway boundary or the obstacle in the roadway exceeds a predetermined distance.

15. A headlight device for a vehicle, comprising:
a lighting device having first illumination means to at least partially illuminate a surrounding of the vehicle and second illumination means to illuminate an underlying surface underneath the vehicle and/or a vehicle bodywork;
means for separating the first and second illumination means embodied as one or both of the following:
a dividing wall in said lighting device disposed to separate the first illumination means for lighting the surroundings of the vehicle and said means for lighting the underlying surface underneath the vehicle and/or the vehicle bodywork so as to illuminate at least partially different areas; and
a direction-dependent lighting device for respective direction-dependent illumination of at least partially different areas.

16. The headlight device according to claim 15, wherein said lighting device includes light sources selected from the group consisting of an incandescent lamp, gas discharge lamp, arc lamp, and a light emitting diode.

17. The headlight device according to claim 15, further comprising a control device connected to and controlling said lighting device between activation and deactivation, said control device being configured to activate said lighting device when the vehicle speed drops below a predetermined vehicle speed and/or when the vehicle acceleration drops below a predetermined vehicle acceleration.

18. The headlight device according to claim 15, further comprising a control device connected to and controlling said lighting device between activation and deactivation, said control device being configured to deactivate said lighting device when the vehicle speed exceeds a predetermined vehicle speed and/or the vehicle acceleration exceeds a predetermined vehicle acceleration.

* * * * *